United States Patent [19]

Messerschmitt et al.

[11] 4,059,730
[45] Nov. 22, 1977

[54] APPARATUS FOR MITIGATING SIGNAL DISTORTION AND NOISE SIGNAL CONTRAST IN A COMMUNICATIONS SYSTEM

[75] Inventors: David Gavin Messerschmitt, Middletown; Timothy James Zebo, Freehold, both of N.J.

[73] Assignee: Bell Telephone Laboratories, Incorporated, Murray Hill, N.J.

[21] Appl. No.: 715,122

[22] Filed: Aug. 17, 1976

[51] Int. Cl.² ............................................ H04J 6/02
[52] U.S. Cl. ............................................. 179/15 AS
[58] Field of Search ............ 179/15 AS, 1 VC, 1 SC; 331/78

[56] References Cited

U.S. PATENT DOCUMENTS

| 2,541,932 | 2/1951 | Melhose | 179/15 AS |
| 3,878,337 | 4/1975 | Fariello | 179/15 AS |
| 3,944,945 | 3/1976 | Corte | 331/78 |
| 4,001,505 | 1/1977 | Araseki | 179/1 SC |
| 4,002,841 | 1/1977 | Ching | 179/15 AS |

FOREIGN PATENT DOCUMENTS 2,215,837  10/1973  Germany .......................... 179/1 VC

OTHER PUBLICATIONS

"Noise Limiters at Work", John D. Lenk, Radio-Electronics, Feb. 1968, pp. 44–45.
"Analysis and Digital Realization of a Pseudorandom Gaussian and Impulsive Noise Source", Y. Neuvo and W. Ku, IEEE Trans. Comm., Com-23, No. 9, Sept. 1975, pp. 849–858.

Primary Examiner—Kathleen H. Claffy
Assistant Examiner—Kenneth A. Chayt
Attorney, Agent, or Firm—Richard J. Roddy

[57] ABSTRACT

In a communications system such as a time assignment speech interpolation (TASI) system for concentrating signals from N trunks onto C channels (C < N), and for expanding same, it is common for a speech signal to pass through a plurality of transmitter/receiver terminals, perhaps connected for tandem operation. Unfortunately, transmitter speech detector clipping of the speech signal leads to a distortion accumulation problem. Also, while a calling trunk is inactive, an inserted noise signal is commonly furnished by a receiver to the called trunk to avoid an aural "too quiet" condition. Unfortunately, actual calling trunk noise and the called trunk inserted noise may differ, leading to a noise signal contrast problem. To mitigate the signal contrast problem, communications apparatus including an improved noise signal inserting arrangement, responsive to a measure of calling trunk noise, supplies an adaptively adjusted, deterministic, pseudorandom noise signal to the called trunk. Thereafter, the presence or absence of the deterministic signal may be detected at a tandem transmitter and, responsive to its absence, the speech detector, at the tandem transmitter is overridden to mitigate the distortion accumulation of speech signal clipping.

11 Claims, 10 Drawing Figures

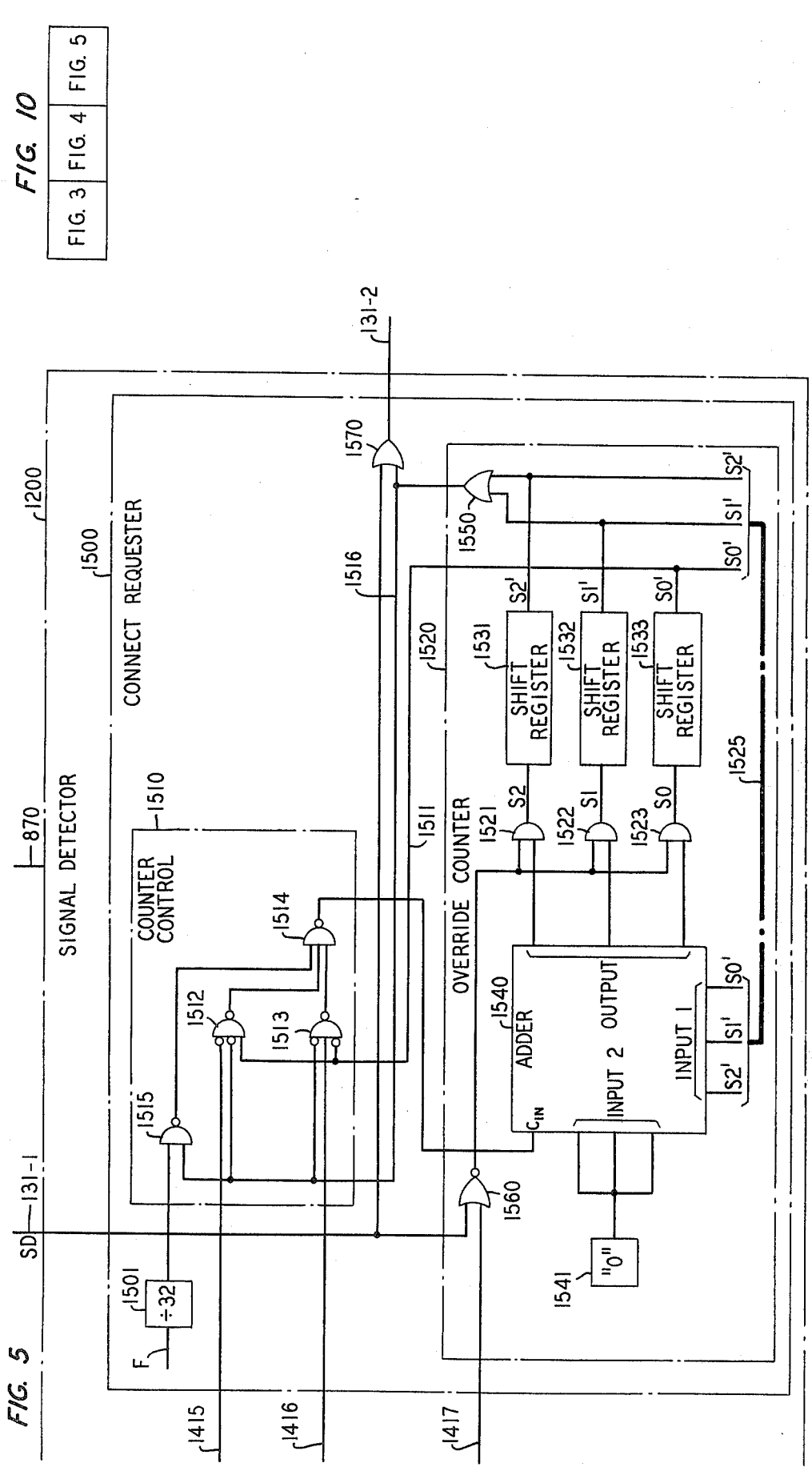

APPARATUS FOR MITIGATING SIGNAL DISTORTION AND NOISE SIGNAL CONTRAST IN A COMMUNICATIONS SYSTEM

BACKGROUND OF THE INVENTION

This invention relates to communications apparatus and, more particularly, to apparatus for mitigating signal contrast and signal distortion in a communications system.

In a communications system such as the improved time assignment speech interpolation (TASI) system known as a digital speech interpolation (DSI) system and disclosed in U.S. Pat. No. 4,002,841 issued to Y. Ching-A. M. Hofmann-D. G. Messerschmitt, bandwidth can be reduced by utilizing speech inactivity time. For example, a speech signal from each of N calling parties may be provided over a respective trunk to a transmitter. Situated at the transmitter is a speech detector for detecting the activity status on the trunk, i.e. speech activity and speech inactivity times, as well as for defining time slots on a transmission link between the transmitter and a receiver during which a connection should be made between the calling and a called party. The transmission link includes a plurality of C channels, C being less than N. A channel is selected for the connection responsive to the detection of speech activity. Once selected, the trunk speech signal is extended from the trunk through the transmitter thence over the channel to the receiver. At the receiver, an inverse operation usually occurs. That is, the signal on one of the C channels is supplied to a respective one of a plurality of receiver trunks, and, eventually, to the called party. Later, upon detection of speech inactivity, the connection thus established is released and the channel capacity made available to another active trunk. Thereby, bandwidth between transmitter and receiver is reduced by concentrating signals between a plurality of calling trunks and a plurality of called trunks over a lesser plurality of channels.

In speech interpolation systems of the type disclosed in U.S. Pat. No. 2,541,932, it is common for the speech signal to pass through the transmitter to the receiver, and therethrough to a second transmitter, therethrough to a second receiver, etc., i.e., through a plurality of communications apparatuses which are connected for tandem operation. Unfortunately, the speech detector of a transmitter tends to clip, and hence distort, at least the initial segment of the speech signal. Too, in a tandem system wherein the speech signal passes through a plurality of transmitters, the distortion may tend to accumulate.

Accordingly, an object of the present invention is to mitigate the accumulation of signal distortion in a communications system.

Inasmuch as the calling trunk is not usually connected on a continuous basis to the called trunk, e.g., during periods of speech inactivity, the called party may perceive the disconnection with the calling party. Thus, during speech inactivity, it is well known for receiver communications apparatus to insert a noise signal over the called trunk so that the called party perceives the continued existence of the connection when there is no connection. Notwithstanding, the called party may object to an annoying contrast between the inserted noise and the noise commonly present on the calling trunk, for example, Gaussian noise.

Therefore, another object of the present invention is to mitigate noise signal contrast in a communications system.

SUMMARY OF THE INVENTION

These and other objects of our invention are achieved in an improved system for communicating signal samples between a transmitting station and a receiving station. In one aspect of our invention, the unfavorable accumulation of distortion related to speech signal clipping is mitigated by communications apparatus for overriding the speech detector. For example, at a transmitter, responsive to the failure to detect a sequence of deterministic signals, and even though the speech detector may detect a speech inactivity time, an active speech status signal may be furnished, thereby overriding the speech detector provided status signal.

According to another aspect of our invention, noise signal contrast in a communications system is mitigated responsive to an adaptively adjusted measure of the input noise. By way of example, a measure of input noise is inserted by the transmitter at a predetermined location within the digital format of a multiframe for transmission to a receiving station. The noise measure, being inserted at the predetermined location, is readily detectable at the receiver.

According to a further aspect of our invention, the adaptive noise measure is a measure of calling trunk noise power.

In accordance with still another aspect of our invention, responsive to the noise measure, an adaptively adjusted deterministic signal is inserted by communications insertion apparatus illustratively situated at the receiver. The deterministic signal, when detected at a tandem transmitter, may be employed to mitigate the accumulation of distortion related to speech signal clipping.

BRIEF DESCRIPTION OF THE DRAWING

Our invention should become more apparent from the following detailed description when taken in conjunction with the drawing, in which:

FIG. 5 illustrates a connect requester for use in the transmitter signal detector of FIG. 1 in providing an activity status signal;

FIG. 6 illustrates a noise estimator for use in the transmitter of FIG. 1 in measuring noise power;

FIG. 10 illustrates the orientation of FIGS. 3, 4 and 5.

DETAILED DESCRIPTION

Figure 1:
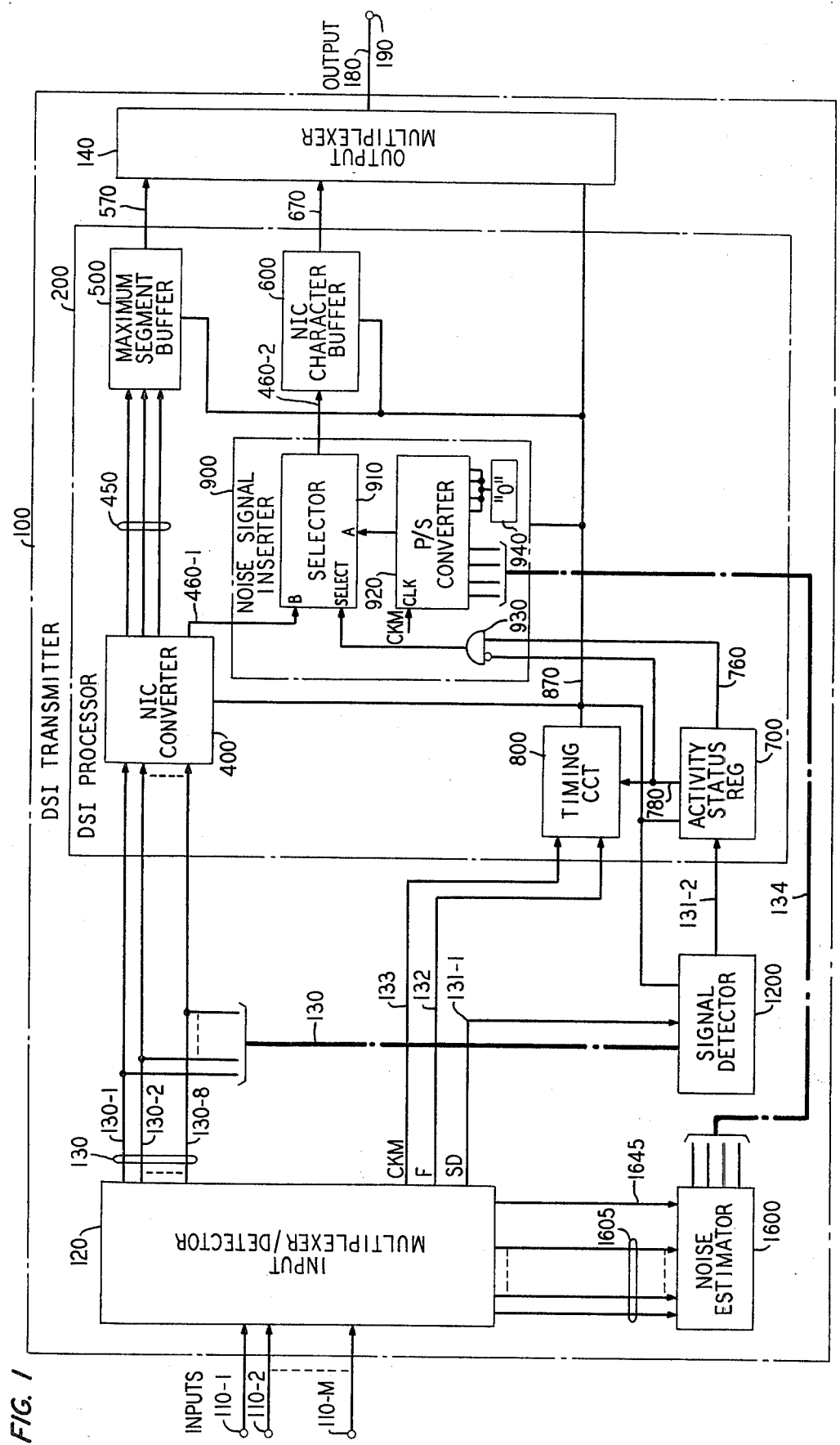
FIG. 1 is a schematic block diagram, illustrative of transmitter communications apparatus in accord with the principles of our invention.

An illustrative embodiment of digital speech interpolation (DSI) transmitter communications apparatus in accord with the principles of our invention is shown in the block diagram schematic of FIG. 1 as DSI transmitter 100. The transmitter is broadly similar to that disclosed in the aforementioned Ching et al. U.S. Pat. No. 4,002,841, having added thereto signal detector 1200, noise estimator 1600 and noise signal inserter 900, inter alia, for mitigating distortion accumulation and noise signal contrast in a speech interpolation system. Accordingly, the teaching of the Ching et al patent is incorporated herein by reference. Also, for purposes of brevity, our illustrative embodiment will be described in terms of the transmitter. However, it will be clear that the principles of our invention apply also to receiver communication apparatus.

Generalizing and in a manner similar to the prior art, one of a plurality of multibit input data frames is provided to a respective one of a plurality of input terminals 110-1 through 11-M of DSI transmitter 100. Each input frame includes a framing signal and a plurality of L time slots. For example, in the Bell System T-Carrier system, a speech signal sample from each of (L =) 24 trunks is multiplexed as an eight-bit pulse code modulation (PCM) character into a respective time slot of a 193-bit frame, and the frame is provided at a nominal bit rate of 1.544 megabit per seconds (Mb/s). Stated alternatively, the time duration of the frame is about 125 microseconds. For ease of exposing our illustrative embodiment, each input data frame character is assumed to be an eight-bit PCM character of the form "SABCWXYZ." The initial bit of the PCM character, labeled S, represents the sign or polarity of the speech signal sample. The coarse amplitude of the speech sample, known as a segment value, is represented by the three bits following the sign bit and is labeled ABC. Finally, the remaining four bits, called the mantissa bits and labeled WXYZ, represent one of 16 usually equal length speech sample magnitude intervals present in each one of eight segments. The eight-bit PCM characters provided at terminals 110-1 through 110-M, here assume (M =) eight input terminals, are extended through input multiplexer/detector 120, then in parallel format over leads 130-1 through 130-8 of data bus 130 jointly, as in the prior art, to DSI processor 200 and, unlike the prior art, to signal detector 1200. The PCM characters furnished to DSI processor 200 are converted by NIC converter 400 to nearly instantaneous companded (NIC) characters.

Figure 2:
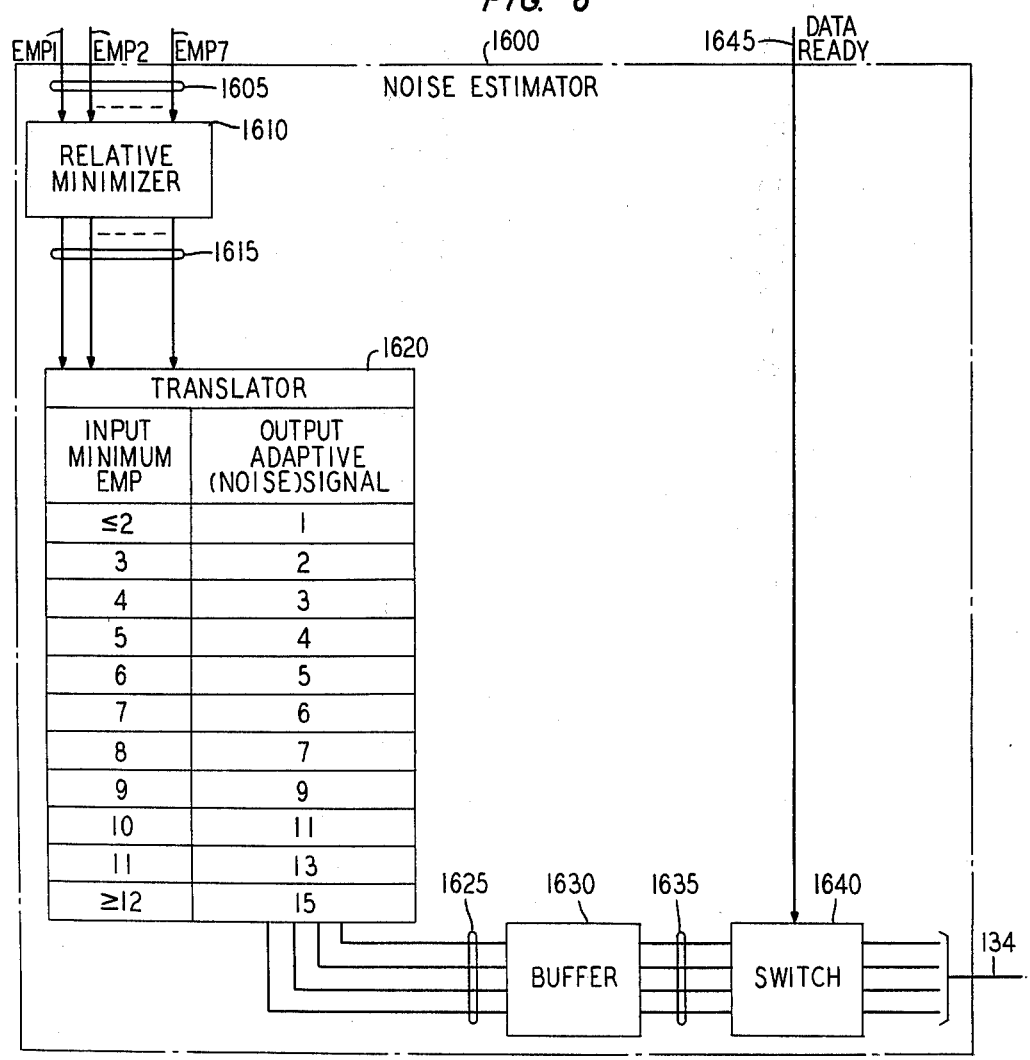
FIG. 2 illustrates a PCM-to-NIC code translation useful in explaining the operation of the transmitter in FIG. 1.

An eight-bit PCM-to-eight-bit NIC conversion, as disclosed in the aforecited Ching et al patent, is repeated for easy reference in our FIG. 2. By way of quick review of a relevant portion of that conversion, a prefixed number of consecutive PCM characters from a trunk, illustratively eight characters, is called a PCM block. The eight-character PCM block is stored in a frame delay store within converter 400. While so stored, the maximum segment value present in the PCM block is determined. The three-bit maximum segment value is then extended over cable 450 to maximum segment buffer 500. Also, character-by-character, each PCM character in the PCM block is converted to produce an eight-bit NIC digital character of the type shown in FIG. 2. In the prior art, the NIC characters are serially extended directly from converter 400 to NIC character buffer 600. In contradistinction, in our illustrative embodiment NIC characters are extended from converter 400 over lead 460-1 through noise signal inserter 900, thence over lead 460-2 to NIC character buffer 600. A noise signal contrast mitigating advantage resulting from the operation of noise estimator 1600 and noise inserter 900 will shortly be made clear. However, in either the prior art or the instant case, if the trunk is active, characters in buffer 600 are perhaps truncated to reduce overload and then inserted into an output multiframe.

In a manner similar to the prior art, our illustrative output multiframe includes a plurality of output frames, each having a format different than that of the input frame. Specifically, each illustrative output frame is 394 bits in length and is partitioned as a four-bit signaling field, a 24-bit activity status field and a 366-bit data field.

Figure 7:
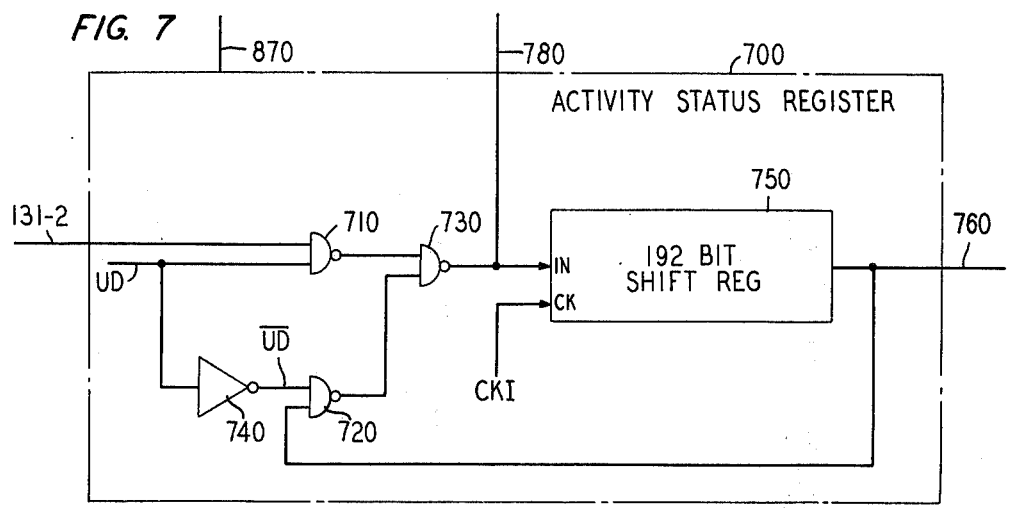
FIG. 7 illustrates an activity status register for use in the transmitter of FIG. 1.

The activity status field includes three bits for each of eight trunks. However, it is sufficient for this disclosure to describe only one bit thereof. That bit is sufficient to indicate whether a trunk is active or inactive and is set or reset responsive to a trunk activity status signal. The activity status signal is extended from signal detector 1200 over lead 131-2 to activity status register 700 of DSI processor 200. A distortion accumulation mitigating advantage resulting from the operation of signal detector 1200 will shortly be made clear. Register 700, illustrated in FIG. 7, is substantially identical to the prior art activity status register in supplying the new activity status over lead 780. Also, as described in the Ching et al patent, the old activity status is stored in shift register 750. Thereby, the activity status of the trunk when last sampled, i.e., the old activity status, is obtainable over lead 760 from an output of shift register 750. Illustratively, if the new (or old) activity signal is a logic one, the trunk is presumed to be (or to have been) active; if a logic zero, then inactive.

The 366-bit data field includes one NIC character from each of up to (L × M =) 192 active trunks. From the above it should be clear that, inasmuch as a frame includes one NIC character from each active trunk, the eight-character NIC block is transmitted over eight consecutive frames. Also, since our illustrative embodiment includes 192 trunks and each output frame includes the activity status for eight trunks, our multiframe includes 24 frames. Finally, each output multiframe is extended through output multiplexer 140 over lead 180 to output terminal 190 for transmission to the receiver. With the above generalized overview of the prior art and of our illustrative embodiment, attention can now be directed to specific aspects of our invention.

According to one aspect of our invention, the unfavorable accumulation of the distortion related to speech signal clipping is mitigated by apparatus for overriding the speech detector. Broadly, and as is illustrated in part in FIG. 1, each PCM character is extended over data bus 130 to signal detector 1200 for detecting the presence or absence of a deterministic signal. Responsive to the detection of the presence of the deterministic signal, an inactive trunk activity status signal may be provided over lead 131-2 to status register 700. Responsive to the detection of the absence of the deterministic signal, and even though the speech detector situated within input multiplexer/detector 120 provides an inactive trunk signal, an active trunk activity signal maybe so provided over lead 131-2. Thereby, not only does signal detector 1200 include apparatus for detecting a deterministic signal, but detector 1200 also includes apparatus for overriding the speech detector. That is, in overriding the speech detector, notwithstanding the extension over lead 131-1 of an inactive trunk activity status signal from the speech detector, an active trunk activity status signal is provided over lead 131-2 by signal detector 1200. Advantageously, in overriding the speech detector, the accumulation of distortion is mitigated.

Figure 3:
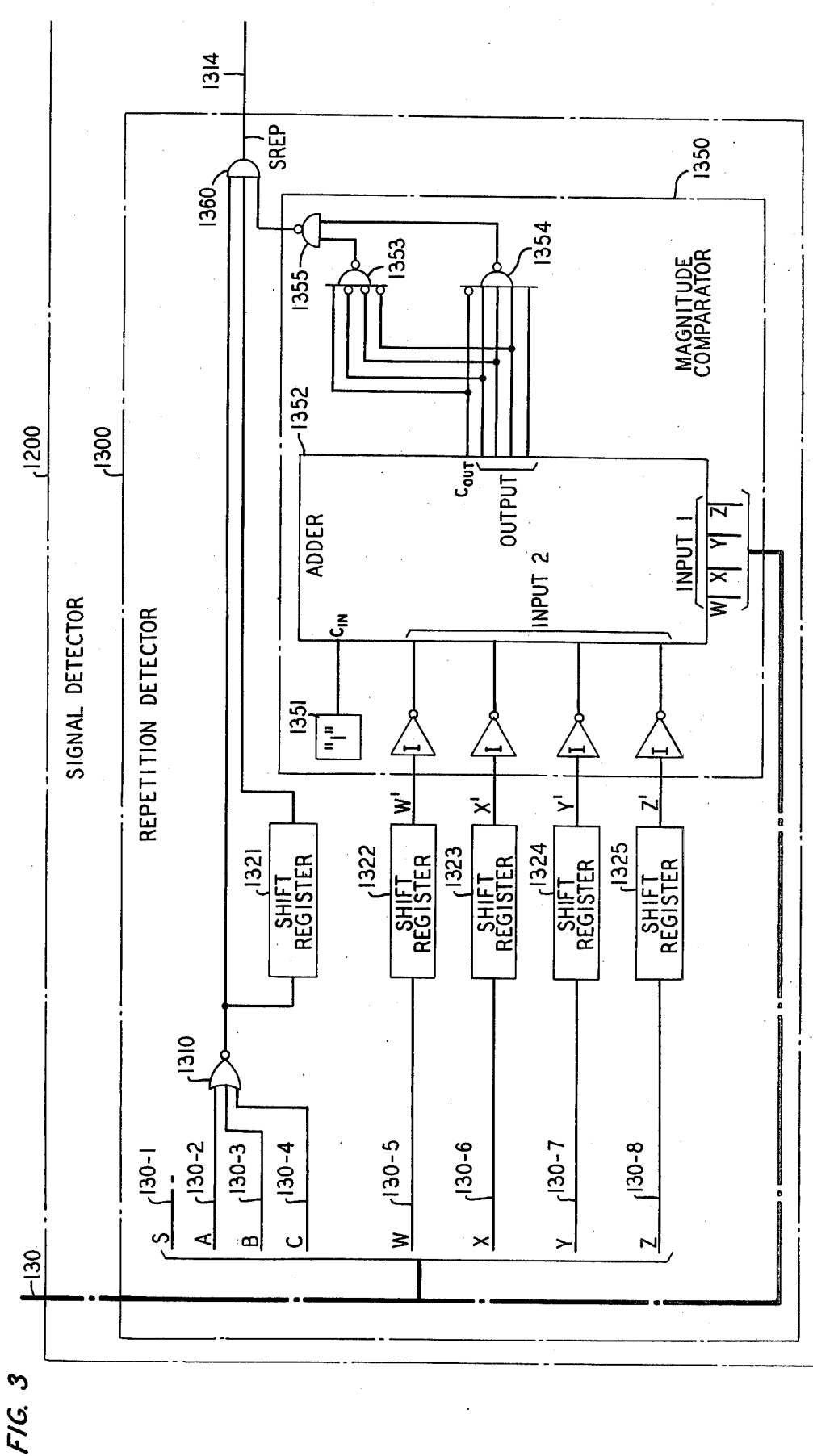
FIG. 3 illustrates a repetition detector for use in a transmitter signal detector of FIG. 1 in detecting a deterministic signal.
Figure 4:
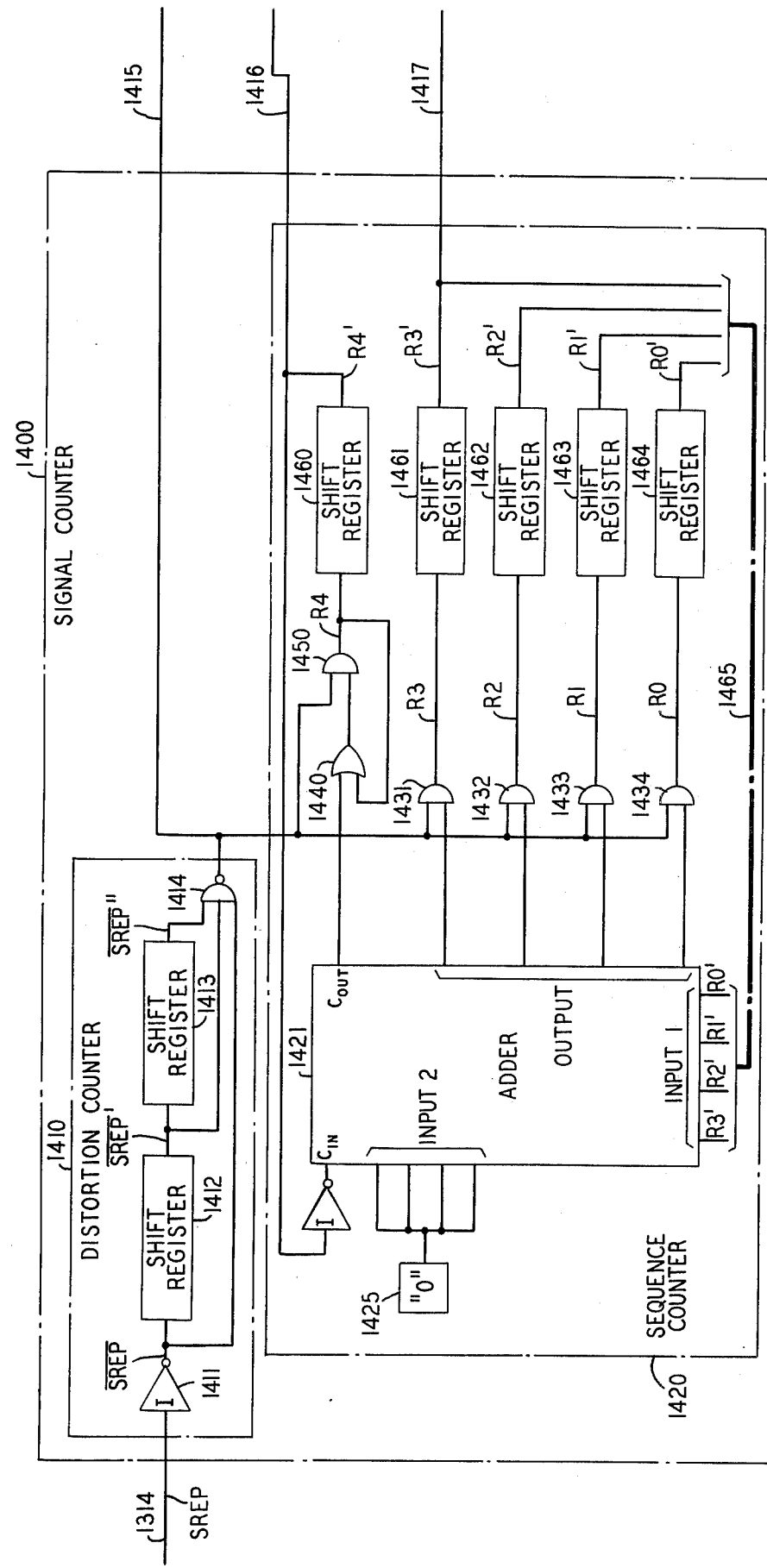
FIG. 4 illustrates a signal counter for use in the transmitter signal detector of FIG. 1 in counting the number of detected deterministic signals.

To exemplify this first aspect of our invention, the deterministic signal on the trunk is assumed to be a digital character of the form "SOOOWXYZ." In alternative embodiments, the eight bits could be a prefixed combination of bits and signal detector 1200 could search either for a single such character or for a sequence of such characters. However, in our illustrative embodiment still another alternative is employed. Conveniently, our embodiment accommodates a pragmatic consideration, namely deterministic signal distortion. In particular, signal detector 1200 includes repetition detector 1300 illustrated in FIG. 3 for detecting the deterministic signal, signal counter 1400 illustrated in FIG. 4 for counting the number of detected deterministic signals, and connect requester 1500 illustrated in FIG. 5 for extending the activity status signal to lead 131-2. FIGS. 3, 4 and 5 are arranged as shown in FIG. 10.

Referring to FIG. 3, consecutive characters on the trunk are extended over data bus 130 to repetition detector 1300. Repetition detector 1300 ignores sign bit S which appears on lead 130-1. The reason therefor is related to the noise signal contrast mitigating aspect of our invention described in detail below. As to the remaining seven bits of each character, repetition detector 1300 searches for consecutive characters having a zero segment value and having a mathematical magnitude difference not exceeding one. Such a sequence of characters is illustrative of a sequence of deterministic signals. Thus our deterministic signal need not be a prefixed combination of bits. Rather, our deterministic signal is a digital signal having definable attributes which may be employed to detect the presence or absence of the signal. Specifically, in FIG. 3, the three segment bits ABC are extended respectively over leads 130-2, 130-3 and 130-4 to respective inputs of NOR gate 1310. In standard fashion, an output signal of the NOR gate is a logic one if each of the three segment bits is a logic zero; otherwise the output is a logic zero. The output signal of gate 1310, supplied jointly to an input of (L × M =) 192-bit shift register 1321 and to a first input of AND gate 1360, is stored in register 1321 until the next character on the trunk is similarly tested. Later, the stored NOR gate signal is read therefrom for indicating whether or not the PCM character immediately prior on the trunk included a zero segment value. The read output of shift register 1321 is extended to a second input of AND gate 1360. A third input of AND gate 1360 is supplied thereto from an output of magnitude comparator 1350. Functionally the output signal of comparator 1350 is a logic one signal if the mantissa bits, and hence the magnitude for a zero segment value character, of two consecutive characters mathematically differ by no more than one; else, the output is a logic zero. In that respect, each of the four mantissa bits WXYZ is provided over a respective lead 130-5 to 130-8 jointly to a respective (L × M =) 192-bit shift register 1322 to 1325 and to respective first inputs of magnitude comparator 1350. In similar fashion, each mantissa bit of the character immediately prior on the trunk, here labeled with a prime as for example W', is furnished from an output of a respective shift register 1322 to 1325 to a respective inverting second input of comparator 1350. The two inputs are compared thereby to supply the third input to AND gate 1360. An output of AND gate 1360 is a logic one upon detection of the coincidence of a zero segment value in consecutive characters and of the magnitude of the consecutive characters mathematically differing by no more than one. Thereafter, the output of gate 1360, labeled SREP and herein referred to as the sample repetition detection signal, is extended over lead 1314 from repetition detector 1300 to signal counter 1400 illustrated in FIG. 4.

Signal counter 1400 is for counting the number of detected deterministic signals. Functionally, counter 1400 counts two events. The first event relates to the failure to detect the deterministic signal, or to the detection of the absence of the deterministic signal. On occasion, signals on the trunk including the deterministic signal may be significantly distorted, for example, from the presence of unfortuitous inactive trunk noise. As a result, detector 1300 may fail to detect the deterministic signal. To mitigate against such failure, signal counter 1400 includes distortion counter 1410 for detecting, illustratively, three consecutive characters, each character having failed to be detected by repetition detector 1300 as the deterministic signal. Specifically, distortion counter 1410 includes, in cascade, inverter 1411 and (L × M =) 192-bit shift registers 1412 and 1413, an output of each of the three pieces of apparatus being extended to a respective input of NAND gate 1414. Functionally, an output of NAND gate 1414, and hence of distortion counter 1410 as supplied to lead 1415, is a logic zero upon detection of three consecutive logic zero SREP signals on lead 1314; otherwise, the output of gate 1414 is a logic one. Accordingly, a logic zero signal at the output of distortion counter 1410 indicates the detection of three consecutive signals on the trunk, none of which is the deterministic signal, i.e., the logic zero indicates the failure to detect the deterministic signal. In that situation, the deterministic signal may have been distorted or the trunk may be active.

The second event counted by counter 1400 relates to detecting a predetermined length sequence of deterministic signals. It should be clear that the deterministic signal, being of the digital format of a PCM character, may appear to be a quantized speech sample, and vice versa. Thus, on occasion, consecutive speech samples may be detected as deterministic signals. As a result, and assuming the speech detector does not detect the trunk as active, the trunk activity signal on lead 131-2 may indicate the trunk to be inactive when it is active. To mitigate against such an occurrence, signal counter 1400 includes sequence counter 1420 for counting a predetermined plurality of consecutive deterministic signals, illustratively 16, before requesting an inactive trunk activity status signal be extended by connect requester 1500 over lead 131-2. Specifically, the output of distortion counter 1410 is extended jointly over lead 1415 to connect requester 1500 and to sequence counter 1420. Within the latter, the output of counter 1410 is furnished jointly to first inputs of AND gates 1450 and 1431 to 1434 for enabling sequence counter 1420. An output signal from each of AND gates 1431 to 1434 is furnished to an input of a respective (L × M =) 192-bit shift register 1461 to 1464, delayed therein until the next character on the trunk, and supplied from an output of the respective shift register over cable 1465 to respective first inputs of adder 1421. Second inputs to adder 1421 are logic zero signals provided by apparatus 1425. Functionally, a logic one output from distortion counter 1410 enables sequence counter 1420. Responsive thereto, adder 1421 is incremented once for each character on the trunk until a carry output ($C_{OUT}$) logic one, indicating a sequence of 16 deterministic signals has been detected, is provided to a first input of OR gate 1440. The logic one is extended through OR gate 1440, combined by AND gate 1450 with the logic one output of distortion counter 1410, delayed in (L × M =) 192-bit shift register 1460 until the next character on the trunk, and thence provided over lead 1416 to connect requester 1500 for indicating thereto the detection of at least 16 consecutive deterministic signals.

Connect requester 1500, illustrated in FIG. 5, is for extending the activity status signal to lead 131-2. An active trunk activity signal is extended through OR gate 1570 responsive either (1) to the detection of a speech detector supplied active trunk signal on lead 131-1 or (2) to the detection of the absence of the predetermined length sequence of 16 deterministic signals on the trunk, the absence being detected after the sequence had been previously detected. On the one hand, and paralleling the prior art, a logic one active trunk signal is extended from the speech detector, when it detects active speech, within input multiplexer/detector 120 over lead 131-1, through a first input of OR gate 1570, and thence onto lead 131-2. On the other hand, in the absence of an active trunk signal from the speech detector, i.e., in the presence of a logic zero signal on lead 131-1 for indicating an inactive trunk, prior art arrangements would supply an inactive trunk activity status signal to activity status register 700. In contradistinction and in accordance with this first aspect of our invention, a change in state of the logic signal on lead 1415 indicates that more than three consecutive characters on the trunk have failed to be detected as the deterministic signal. Accordingly, the trunk is presumed to be active. Responsive thereto, our communications apparatus includes an arrangement which provides an active trunk activity signal. The active signal is provided by override counter 1520 to a second input of OR gate 1570, thence onto lead 131-2. Advantageously, our active trunk status signal is provided even though the speech detector may provide an inactive trunk signal to the first input of OR gate 1570. In so doing, signal detector 1200 not only detects the presence or absence of the deterministic signal but also overrides the speech detector. Advantgeously, the subsequent accumulation of the signal distortion in a tandem speech interpolation system is mitigated.

We now turn to a more particular description of override counter 1520. The output of override counter 1520 is a logic one indicating an active trunk if the output of adder 1540 therewithin is equivalent to a decimal count of two through seven inclusive. The manner in which adder 1540 is incremented to reach said count will now be described. At the start, adder 1540 is initialized to provide a zero output responsive to a zero input, the zero input being provided by apparatus 1541 to a second input of adder 1540. The zero input to adder 1540 permeates through the output, AND gates 1521 through 1523, and respective shift registers 1531 through 1533, thence over cable 1525 to a first input of adder 1540. Concurrently, the zero output of shift register 1533 is supplied over lead 1511 to respective first inputs of NAND gates 1512 and 1513, the latter an inverting input of counter control 1510. As aforedescribed, upon detection of the first predetermined sequence of 16 deterministic signals, a logic one signal is extended from signal counter 1400 over lead 1416 to requester 1500 and therein to a second input of NAND gate 1513. The logic zero outputs of shift registers 1531 and 1532 are extended to respective first and second inputs of OR gate 1550, thence over lead 1516 jointly to a third inverting input of NAND gate 1513, a second inverting input of NAND gate 1512 and a first input of NAND gate 1515. Responsive to the aforementioned three inputs to NAND gate 1513, a logic zero output of NAND gate 1513 results in a logic one reset signal being extended by NAND gate 1514 to a $C_{IN}$ input of adder 1540, thereby enabling override counter 1520. As a result upon detection of 16 consecutive deterministic signals, adder 1540 is incremented once. Its logic one output is extended from adder 1540 through AND gate 1523, shift register 1533, over lead 1511 to NAND gate 1513 for disabling the incrementing of adder 1540. Subsequently, upon detection of the change in state of the signal appearing on lead 1415 for indicating that more than three consecutive characters on the trunk have failed to be detected as the deterministic signal, counter control 1510 (by way of NAND gates 1512 and 1514) reenables override counter 1520, thereby incrementing adder 1540 to reflect a count of two. As a result, a logic one signal is extended through AND gate 1522, shift register 1532 and OR gate 1550 to the second input of OR gate 1570. Thereby, an override active trunk activity signal is provided to lead 131-2.

We now turn the description to the duration the override active trunk activity signal is so provided. Control of the duration is another advantage of our illustrative connect requester 1500. As a practical matter, noise on an inactive trunk may significantly distort a plurality of the deterministic signals. As an unfortunate consequence of the distortion, a change in state of the output of distortion counter 1410 may occur, giving rise to a premature override active trunk activity signal being provided to status register 700. To mitigate against such an occurrence, responsive to the change in state on lead 1415, our illustrative connect requester 1500 continues to provide the speech detector override active trunk activity signal over lead 131-2 until one of three events is thereafter detected, to wit: (1) an active trunk activity signal is detected on lead 131-1; (2) a prefixed time has elapsed and an active trunk activity signal has not been detected on lead 131-1; or (3) a second predetermined length sequence of deterministic signals is detected on the calling trunk.

Broadly, the first two events recognize that, if active speech is indeed on the trunk, the speech detector will detect same within a reasonable period of time and provide an active trunk status signal to lead 131-1. The third event recognizes the possibility of a short burst of errors, perhaps caused by deterministic signal distortion, in an otherwise long sequence of deterministic signals.

More particularly, as to the first event, if indeed the speech detector within input multiplexer/detector 120 does detect active speech, the active trunk activity signal supplied thereby is, as aforedescribed, extended over lead 131-1 through the first input of OR gate 1570 onto lead 131-2. Such is the dominant source of the active trunk signal. Therefore, concurrent therewith, the signal on lead 131-1 is supplied to a first input of NOR gate 1560 within override counter 1520 for resetting to a logic zero the override signal provided to the second input of OR gate 1570. That is, in response to a logic one input on lead 131-1, a logic zero output is supplied by NOR gate 1560. The logic zero permeates through AND gates 1521 to 1523, shift registers 1531 to 1533, OR gate 1550 and, as an output of override counter 1520, to the second input of OR gate 1570. Thereby, connect requester 1500 is reset and the dominant active trunk signal, i.e., the active trunk signal from the speech detector, is extended to status register 700.

As to the second event, responsive to the override logic one output of override counter 1520, which as aforementioned is supplied to inverting inputs of NAND gates 1512 and 1513, each of said two NAND gates furnishes a logic one to a respective input of NAND gate 1514. In addition, the logic one output of counter 1520 enables NAND gate 1515 to pass framing pulse F to another input of NAND gate 1514, the latter extended in FIG. 1 from input multiplexer/detector 120 over lead 132 through timing circuit 800 thence over cable 870 to "÷32" counter 1501 in FIG. 5. As discussed in the Ching et al patent, each input frame duration, and hence the duration between consecutive logic one framing pulses F, is about 125 microseconds (= 193 bits per frame/1.544 Mb/s). Thereby, a second framing pulse logic one is provided from an output of "÷32" counter 1501 through second input of NAND gate 1515 of counter control 1510, each approximately (32 × 125 microseconds) four milliseconds, to a third input of NAND gate 1514. Responsive thereto and by way of an output of NAND gate 1514 connected to a $C_{in}$ input of adder 1540, adder 1540 of override counter 1520 is incremented. The respective parallel outputs of adder 1540 are supplied through enabled AND gates 1521 to 1523 to a respective shift register 1531 to 1533. An output of each of shift registers 1531 and 1532 is furnished to respective first and second inputs of OR gate 1550. Thereby, a logic one active trunk activity signal is furnished to the second input of OR gate 1570 for overriding the speech detector. The override signal continues to be furnished for adder 1540 output counts two through seven, i.e., during six of the aforesaid four millisecond increments, which equals an elapsed time of about 24 milliseconds. Subsequent thereto and in the absence of a speech detector supplied active trunk activity signal on lead 131-1, override counter 1520 is reset, adder 1540 being a three-bit counter. Hence, the active trunk speech detector override signal on lead 131-2 is reset to a logic zero inactive trunk activity signal. That is, after six such four millisecond increments of counter 1520, the active trunk signal provided on lead 131-2 is reset to indicate an inactive trunk, it being presumed that active speech, if present, would have been detected by the speech detector within the time of 24 milliseconds. Thereby, the premature indication of an active trunk has been removed and the trunk activity signal reset to indicate an inactive trunk.

As to the third event, the deterministic signal may reappear on the trunk, the premature interruption thereof perhaps being attributable to deterministic signal distortion. Thus, the trunk is indeed inactive. Accordingly, the override active trunk activity signal which is extended to lead 131-2 should be removed and an inactive trunk signal substituted therefor. In accord with this advantage of connect requester 1500, the active trunk signal continues until, for example, at least eight consecutive deterministic signals are detected on the trunk. That is, the trunk is presumed inactive upon detection of a second predetermined length sequence. The latter is a lesser length sequence than the first sequence. It too is detected by signal counter 1400 and when detected is extended as a logic one signal from signal counter 1400 over lead 1417 to a second input of NOR gate 1560 of override counter 1520. Therefore an output of NOR gate 1560 is a logic zero for resetting override counter 1520 and supplying a logic zero output to the second input of OR gate 1570, thence onto lead 131-2 as an inactive trunk activity signal to status register 700.

According to a second aspect of our invention, noise signal contrast in a communications system is mitigated responsive to an adaptively adjusted measure of noise on the calling trunk. The measure is then, illustratively, inserted by the transmitter in a predetermined location within the digital format of a multiframe. The predetermined location is chosen consistent with a minimal, if any, increase in bandwidth. At the receiver, the adaptive measure, being in the predetermined location, is readily detectable. Responsive to its detection, an improved noise signal is inserted by the receiver on the called trunk. Advantageously, the inserted noise signal is adapted to the measure of the actual noise on the calling trunk and thus obtains a mitigation of the prior art noise signal contrast.

Specifically, in the embodiment illustrated in FIG. 1, the adaptive measure is extended from noise estimator 1600 over cable 134 to noise signal inserter 900. Thereafter, responsive to the coincidence of a logic zero new activity signal on lead 780, indicating the trunk to be currently inactive, and a logic one old activity signal on lead 760, indicating the trunk to have been active for the immediately prior character, the adaptive measure is inserted in the first frame after the trunk becomes inactive. Thereby, the adaptive measure is inserted at a predetermined location within the multiframe. Accordingly, inasmuch as the activity status field of each frame of the multiframe permits extension of the activity status of each trunk from the transmitter to the receiver, as described in the Ching et al patent, receiver apparatus, not shown, may readily locate and detect the adaptive measure and respond thereto by adjusting the noise signal inserted on the called trunk. Further, to obviate unduly increasing bandwidth, the insertion need occur only once for each period of time the trunk is active, which time period typically extends over a plurality of multiframes, and then, only upon detection of the active trunk becoming inactive.

Still more specifically, our illustrative adaptive measure is supplied from estimator 1600 over cable 134 to the high order bit positions of parallel-to-serial converter 920 of noise signal inserter 900. A serial output of converter 920 is furnished to a first input, labeled A, of selector 910. As previously mentioned, NIC characters are extended, as in the prior art, from NIC converter 400 over lead 460-1 and, in accord with this second aspect of our invention, to noise signal inserter 900. Therein the NIC characters are provided to a second input, labeled B, of selector 910. As to a selecting signal, for selecting between the A and B inputs, the old activity status signal is extended over lead 760 from activity status register 700 to a first input of AND gate 930. A second inverted input signal of gate 930 is the new activity status signal provided thereto over lead 780. Functionally, a selecting signal output of AND gate 930 is provided to a SELECT input of selector 910 for selecting, responsive to a logic one selecting signal, the A input or, responsive to a logic zero, the B input thereof. Thus, responsive to an active trunk, i.e., the old activity signal being logic one, becoming inactive, i.e., the new activity signal being logic zero, the A input of selector 910 is selected for inserting the adaptive measure. The adaptive measure at the selected A input is then extended over lead 460-2 to NIC character buffer 600 for insertion in the output multiframe as though it were a NIC character and in a manner substantially identical to that described for NIC characters in the Ching et al patent.

Figure 9:
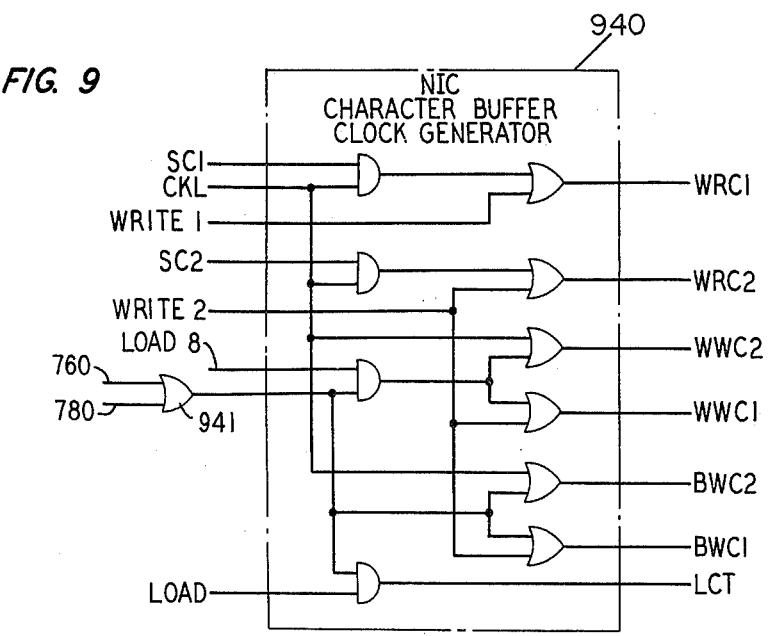
FIG. 9 illustrates a NIC character buffer clock generator for inclusion in a transmitter timing circuit of FIG. 1.

Also, for completeness of disclosure, a minor timing addition is made to the prior art timing circuit 800. In particular, NIC character buffer clock generator 940, illustrated in FIG. 9D of the above Ching et al. patent, has in our illustrative embodiment appended thereto OR gate 941, illustrated in our FIG. 9, having first and second inputs respectively provided over leads 760 and 780. As a result, rather than being responsive to only the new activity, i.e., the new ASV signal on lead 780 in the prior patent, generator 940 is responsive to either new or old trunk activity signal. In responding to either new (on lead 780) or old (on lead 760) activity signal, the adaptive measure is conveniently inserted, as aforedescribed, in the first output frame subsequent to the active trunk becoming inactive. Accordingly, the adaptive measure is inserted at a predetermined location of the multiframe for transmission to and detection by the receiver. Responsive to the adaptive measure, the receiver may adjust and insert an improved noise signal for mitigating noise signal contrast and transmit same to the called party.

According to a third aspect of our invention, the adaptive noise measure is a measure of calling trunk noise power. In particular, our adaptive measure is a measure of calling trunk noise power detected at the transmitter during the inactive time period immediately preceding the trunk becoming active. To more clearly focus on the noise power detecting time period, assume the calling trunk to be inactive. While inactive, the noise power on the trunk is measured and the adaptive noise measure temporarily buffered in buffer 1630 of noise estimator 1600 in FIG. 6. Next, the trunk becomes active. While active, PCM characters detected on the trunk are, as in the prior art, usually NIC encoded by converter 400 and transmitted to the receiver. Thereafter, the trunk again becomes inactive. The buffered adaptive noise measure is then inserted in the multiframe, as aforedescribed, and transmitted to the receiver. Also, during the inactivity time, a new measure of noise power is made for insertion during the next inactive time.

Specifically, the speech detector within input multiplexer/detector 120 may be of the type disclosed in the copending application of R. E. LaMarche-C. J. May-T. J. Zebo Ser. No. 715,121, now U.S. Pat. No. 4,028,496, entitled "Digital Speech Detector" and filed concurrently herewith. The speech detector disclosed therein provides a means for measuring the calling trunk noise power. Using exponentially-mapped-past (EMP) statistical variables, the measuring means includes an arrangement for computing an EMP average of signals detected on the inactive trunk. In general, EMP variables are quantities relating to a set of observations computed in such a way that recent values of the observations contribute more strongly than values observed in the more distant past. Referring to FIG. 6, the seven-bit EMP average, labeled EMP1 to EMP7 on cable 1605, and a data ready signal on lead 1645 are extended from the speech detector, respectively, to relative minimizer 1610 and switch 1640 of noise estimator 1600. To obviate random variation in input noise power, noise estimator 1600 includes minimizer 1610 which may be any standard circuitry for detecting a relative minimum of an input sample, for example, by comparing adjacent input samples during a prefixed time period. Here, the relative minimum of the EMP average is detected during the measuring inactive time period. The minimum average signal is thereafter extended over cable 1615 to translator 1620 for providing the aforementioned adaptive measure over cable 1625 to buffer 1630. Translator 1620 may be a random access memory for translating the input EMP average value, illustrated by way of the decimal value shown in the chart therewithin, to the corresponding output adaptive noise signal measure, the decimal value of which is also therein illustrated. In that regard, it is evident that the output of translator 1620 saturates for an input EMP value greater than 12, in which case the output adaptive signal provided thereby is constrained in our illustrative embodiment to a value of 15. The reason therefor is now described. The magnitude, $X(L,M)$, of calling trunk noise for segment value L, where $0 \leq L \leq 7$, and mantissa value M, where $0 \leq M \leq 15$, with a typical $\mu = 255$ companding law is approximately:

$$X(L,M) = 2^L (M + 16.5) - 16.5. \tag{1}$$

Also, the noise power on a trunk with reference to the power of a full-load sinusoid is approximately:

$$\text{Power} = 3 + 10 \log \left[ \frac{X^2(L,M)}{\frac{X^2(7,15)}{2}} \right] dbmO. \tag{2}$$

Solving power equation (2) for the largest mantissa, i.e., $M = 15$, in the first and second segments, i.e., $L = 0$ and $L = 1$, obtains respectively about $-42.5$ dbmO and $-32.7$ dbmO. Traditionally, a speech detector employs a threshold of about $-40.0$ dbmO to distinguish between speech and noise, with lower, i.e., more negative, values being noise. Clearly, the more negative values occur for $L = 0$ and $M < 15$. Accordingly, our illustrative communications apparatus employs an adaptive measure equal in value to the value of the trunk noise mantissa bits. As an aside, the relationship between noise power and EMP is readily approximated by substituting into power equation (2) and solving same using a zero segment value and a mantissa value equal to the adaptive measure of translator 1620. Advantageously, a zero segment, maximum mantissa adaptive measure value of 15 requires only four bits. Thusly, a four-bit adaptive measure is extended over cable 1625 from translator 1620 to buffer 1630. Thence, responsive to a logic one data ready signal on lead 1645, the adaptive measure is supplied from buffer 1630 over cable 1635 through switch 1640 over cable 134 to, as aforementioned the high order bits of eight-bit parallel-to-serial converter 920 in FIG. 1. The four low order bits of the eight-bit signal to be inserted by noise inserter 900 are logic zeroes, as provided by apparatus 940. Fortuitously, according to this third aspect of our invention, not only is the adaptive measure a sufficient measure of the inactive trunk noise power but also is of a digital format which remains substantially impervious to bit truncation during overload in a digital speech interpolation system. That is, the four low order bits of the adaptive signal may be truncated during overload in a manner described in the Ching et al, patent with no additional noise signal contrast. As a result, the signal contrast problem solved by our invention can be further mitigated.

Figure 8:
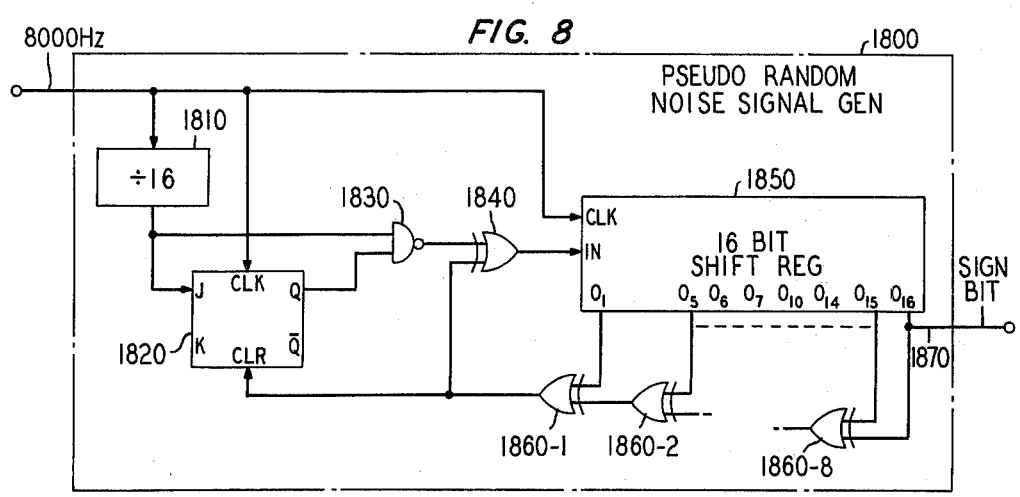
FIG. 8 illustrates a pseudorandom noise signal generator for use in illustrative receiver communications apparatus in accord with the principles of our invention.

According to a fourth aspect of our invention, the deterministic signal and the improved noise signal, both hereinbefore described, may be obtained from the adaptive measure. In particular, the adaptive measure may be readily located and detected by receiver communications apparatus, not shown. Thereafter, the adaptive measure is temporarily buffered in an eight-bit shift register, right shifted four bits, and has appended thereto both a zero segment value and a pseudorandom sign bit, thereby obtaining the previously mentioned improved noise signal. The pseudorandom sign bit may be provided by pseudorandom signal generator 1800, illustrated in FIG. 8. Broadly, our illustrative communications apparatus includes signal generator 1800, which can be a specific realization of a Gaussian input noise source of the type disclosed in Y. Neuvo et al, "Analysis and Digital Realization of a Pseudorandom Gaussian and Impulsive Noise, Source," *IEEE Transactions on Communications*, Vol COM-23, No. 9 (September, 1975), pp. 849–858. Experimentation has led to the subjectively acceptable 16-bit shift register realization with eight shift register outputs, specifically outputs $0_1$, $0_5$, $0_6$, $0_7$, $0_{10}$, $0_{14}$, $0_{15}$ and $0_{16}$ being fed back through a respective exclusive OR gate 1860-1 to 1860-8, flip-flop 1820, NAND gate 1830, and exclusive OR gate 1840 to a shift register input. Fortuitously, the improved noise signal may also be the aforesaid deterministic signal. For example, as previously mentioned, the sign bit of the improved noise signal, here a pseudorandom sign bit, may be ignored by repetition detector 1300 of signal detector 1200. Too, the remaining seven bits include logic zero segment bits and the four-bit adaptive measure as the mantissa bits. Of course, the latter is a measure of the magnitude of the inactive calling trunk noise power. Inasmuch as the magnitude of the intentionally inserted signal will typically not differ from sample to sample, the mathematical difference between consecutive characters will usually not exceed one. Thereby, the deterministic signal not only operates to mitigate distortion related to speech clipping by overriding the speech detector, but also, being adaptively adjusted to a measure of the calling trunk noise power, mitigates noise signal contrast in a speech interpolation system.

Although various aspects of our invention have been described and illustrated in detail, by way of example with respect to transmitter communications apparatus, it is to be understood that the same is not by way of limitation. For example, our teaching as to mitigating noise signal contrast applies to analog as well as digital speech interpolation systems. Thus the spirit and scope of our invention is limited only by the terms of the appended claims.

We claim:

1. Digital communications apparatus having an input terminal adapted to receive a first input signal from a trunk and having an output terminal adapted to transmit an output signal to a channel, said communications apparatus including detection apparatus for detecting the activity status of said trunk and extension apparatus responsive to a first trunk activity status for extending a representation of said first input signal to said output terminal and characterized in that said communications apparatus further comprises:

means for mitigating distortion of said first input signal, said mitigating means including means responsive to a second, deterministic input signal for overriding said detection apparatus, said overriding means including means for detecting the presence of a predetermined sequence of said deterministic signals at said input terminal, and means responsive to said predetermined sequence for signaling a second activity status state to said extension apparatus.

2. Digital communications apparatus having an input terminal adapted to receive a first input signal from a trunk and having an output terminal adapted to transmit an output signal to a channel, said communications apparatus including detection apparatus for detecting the activity status of said trunk and extension apparatus responsive to a first trunk activity status for extending representation of said first input signal to said output terminal and characterized in that said communications apparatus further comprises:

means for mitigating distortion of said first input signal, said mitigating means including means responsive to a second, deterministic input signal for overriding said detection apparatus said overriding means including means for detecting the absence of a predetermined sequence of said deterministic signals at said input terminal, and means responsive to said absence detecting means for signaling said first activity status state to said extension apparatus.

3. Communications apparatus having an input terminal adapted to receive a first input signal from a trunk and having an output terminal adapted to transmit an output signal to a channel, said communications apparatus including detection apparatus for detecting the activity status of said trunk and extension apparatus responsive to a first trunk activity status for extending a representation of said first input signal to said output terminal and characterized in that said communications apparatus further comprises:

means for mitigating distortion of said first input signal, said distortion mitigating means including means responsive to a second, deterministic input signal for overriding said detection apparatus, means for mitigating contrast between an input signal detected during said first trunk activity status state and an input signal detected during a second trunk activity status state, said contrast mitigating means including, means responsive to said second activity status state for measuring noise at said input terminal, and means responsive to said noise measuring means for extending a representation of said measure to said output terminal upon transition of said first activity state to said second activity state.

4. Communications apparatus having an input terminal adapted to receive an input signal from a trunk and having an output terminal adapted to transmit an output signal to a channel, said communications apparatus including detection apparatus for detecting the activity status of said trunk, characterized in that said communications apparatus further comprises:

means for mitigating contrast between an input signal detected during a first trunk activity status state and an input noise signal detected during a second trunk activity status state, said contrast mitigating means including means responsive to said second activity status state for measuring noise on said trunk, and means responsive to said noise measuring means for extending a representation of said measure to said output terminal upon transition of said first activity state to said second activity state.

5. The communications apparatus defined in claim 4 wherein said noise measuring means includes means for measuring the noise power of said second state input signal.

6. The communications apparatus defined in claim 4 wherein said mitigating means further includes means for adaptively adjusting said measured noise representation between a first and a subsequent second occurrence of said second activity status state.

7. The communications apparatus defined in claim 6 wherein said noise representation extending means comprises:

means for extending said adjusted noise representation to said output terminal at a determinable location within said output signal.

8. The communications apparatus defined in claim 4 further comprising:

means for coupling an output of said communications apparatus to deterministic signal insertion apparatus, said insertion apparatus having means responsive to said noise measure for adjusting an output noise signal provided to an output terminal of said insertion apparatus, said output noise signal being a deterministic signal.

9. Communications apparatus having an input terminal adapted to receive an input signal and having an output terminal adapted to transmit an output signal, said communications apparatus including detection apparatus for detecting the activity status at said input terminal and extension apparatus responsive to a first activity status state for extending a representation of said input signal to said output terminal, characterized in that said communications apparatus further comprises:

means mitigating contrast between an input signal detected during a first activity status state and a noise signal detected during a second activity status state, said contrast mitigating means including means responsive to a transition from said first activity status state to said second activity status state for adjusting said output signal by including therein an adaptive representation of said noise.

10. The communications apparatus defined in claim 9 wherein said adaptive representation is a deterministic signal.

11. The communications apparatus defined in claim 10 further comprising means for coupling an output of said communications apparatus to speech detection apparatus and means responsive to said deterministic signal for mitigating signal distortion, said distortion mitigating means including means for overriding said speech detection apparatus.

* * * * *